United States Patent
Chun

(10) Patent No.: US 10,841,386 B2
(45) Date of Patent: Nov. 17, 2020

(54) METHOD AND DEVICE FOR DETERMINING MASTER GATEWAY

(71) Applicant: Samsung Electronics Co., Ltd., Gyeonggi-do (KR)

(72) Inventor: Jaiick Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 136 days.

(21) Appl. No.: 15/105,831

(22) PCT Filed: Dec. 17, 2014

(86) PCT No.: PCT/KR2014/012471
§ 371 (c)(1),
(2) Date: Jun. 17, 2016

(87) PCT Pub. No.: WO2015/093844
PCT Pub. Date: Jun. 25, 2015

(65) Prior Publication Data
US 2016/0323391 A1 Nov. 3, 2016

(30) Foreign Application Priority Data
Dec. 20, 2013 (KR) .......................... 10-2013-0160015

(51) Int. Cl.
*H04L 29/08* (2006.01)
*H04L 12/64* (2006.01)
(Continued)

(52) U.S. Cl.
CPC .......... *H04L 67/16* (2013.01); *H04L 12/6418* (2013.01); *H04L 65/1033* (2013.01);
(Continued)

(58) Field of Classification Search
None
See application file for complete search history.

(56) References Cited

U.S. PATENT DOCUMENTS 7,568,024 B2 7/2009 Lee et al.
2003/0124979 A1\* 7/2003 Tanada .................. H04W 84/20
455/41.1
(Continued)

FOREIGN PATENT DOCUMENTS

CN 101179423 5/2008
CN 102195796 9/2011
(Continued)

OTHER PUBLICATIONS

PCT/ISA/210 Search Report issued on PCT/KR2014/012471 (pp. 3).
(Continued)

*Primary Examiner* — Younes Naji
(74) *Attorney, Agent, or Firm* — The Farrell Law Firm, P.C.

(57) ABSTRACT

A gateway device performs a method for determining a master gateway device. In the method, the gateway device retrieves one or more other gateway devices and sends a request for a service list to the retrieved other gateway devices. Also, the gateway device receives the service list and version information of each service, and based on the received version information of each service, determines whether to change the master gateway device.

7 Claims, 5 Drawing Sheets

(51) Int. Cl.
*H04L 29/06* (2006.01)
*H04L 29/12* (2006.01)
*H04W 88/16* (2009.01)

(52) U.S. Cl.
CPC .......... *H04L 67/12* (2013.01); *H04L 61/1511* (2013.01); *H04L 61/1541* (2013.01); *H04W 88/16* (2013.01)

(56) References Cited

U.S. PATENT DOCUMENTS

| | | | |
|---|---|---|---|
| 2005/0086273 A1* | 4/2005 | Loebbert | H04W 12/0609 |
| 2005/0237926 A1* | 10/2005 | Cheng | H04L 69/40 370/216 |
| 2010/0202450 A1* | 8/2010 | Ansari | H04L 63/10 370/389 |
| 2011/0131518 A1* | 6/2011 | Ohashi | H04L 12/2812 715/769 |
| 2012/0058765 A1* | 3/2012 | Choi | H04W 24/02 455/435.1 |
| 2012/0173725 A1* | 7/2012 | Verma | H04L 63/0815 709/225 |
| 2014/0108350 A1* | 4/2014 | Marsden | H04L 67/1095 707/639 |

FOREIGN PATENT DOCUMENTS

| | | |
|---|---|---|
| JP | 2006203696 | 8/2006 |
| KR | 1020040041834 | 5/2004 |
| KR | 1020060063385 | 6/2006 |
| KR | 1020070066227 | 6/2007 |
| KR | 1020080072165 | 8/2008 |
| KR | 100891916 | 4/2009 |
| WO | WO 2013/041728 | 3/2013 |

OTHER PUBLICATIONS

PCT/ISA/237 Written Opinion issued on PCT/KR2014/012471 (pp. 8).
Chinese Office Action dated Nov. 29, 2018 issued in counterpart application No. 201480069658.6, 20 pages.
Korean Office Action dated Aug. 18, 2020 issued in counterpart application No. 10-2020-0017841, 6 pages.

* cited by examiner

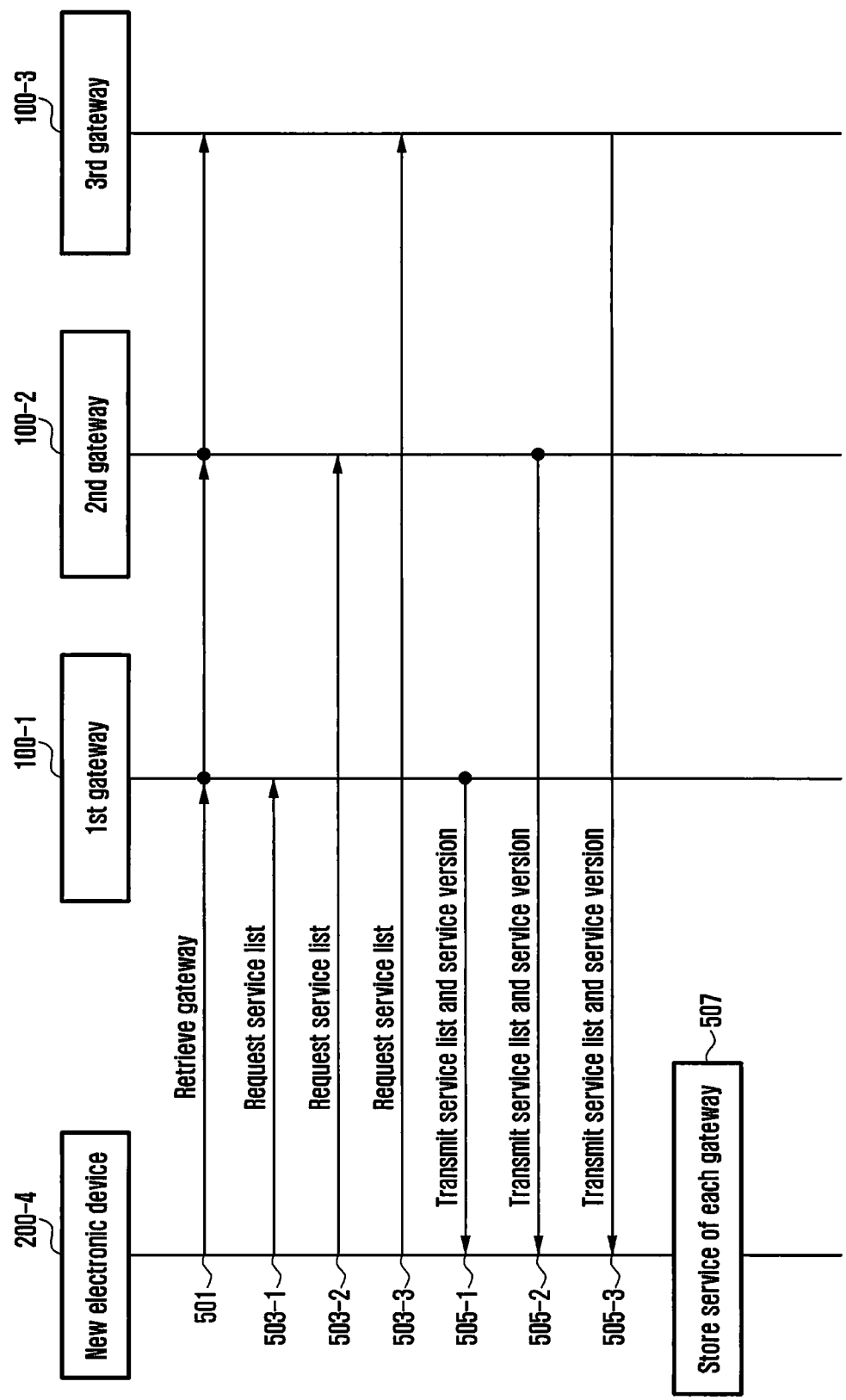

METHOD AND DEVICE FOR DETERMINING MASTER GATEWAY

PRIORITY

This application is a National Phase Entry of PCT International Application No. PCT/KR2014/012471, which was filed on Dec. 17, 2014, and claims priority to Korean Patent Application No. 10-2013-0160015, which was filed on Dec. 20, 2013, the contents of each of which are incorporated herein by reference.

TECHNICAL FIELD

The present invention relates to an electronic device, a gateway device, and a method for determining a master gateway in a home network. Particularly, the present invention relates to a method for determining a master gateway from among one or more gateways equipped in a home network.

BACKGROUND ART

A home network refers to a network constructed among various kinds of information devices in the home. The home network constructs environments that allow electronic appliances to communicate with each other through a wired or wireless network inside the home and to access the internet outside the home.

In such home network environments, it is possible to control various electronic appliances and obtain necessary information by using a portable electronic device (e.g., a smart phone, a mobile terminal, a tablet PC, a wearable device, or a laptop) or a computer out of doors as well as in doors. Also, internet access, video transmission, email transmission and reception, and the like are possible in and out of doors through electronic appliances with home network environments.

DISCLOSURE OF INVENTION

Technical Problem

As a home network is enlarged, it is expected that electronic devices having an indoor gateway function will increase in kinds of products and in view of popularization. By the way, when a plurality of gateways are installed in a single home, there arises a problem of failing to provide all service by allowing only one gateway to be a master gateway. Further, if a newly added gateway is used as a master gateway, it is required to stop a network. This gives rise to another problem of failing to offer a seamless home network service to a user.

The present invention provides an electronic device capable of offering a seamless home network service to a user and also a method for determining a master gateway in a home network even though a gateway device or any other electronic device for a home network control is added to a pre-constructed home network.

Solution to Problem

According to an embodiment of the present invention, a method for determining a master gateway device at a gateway device may include steps of retrieving one or more other gateway devices; sending a request for a service list to the retrieved one or more other gateway devices; receiving the service list and version information of each service; and based on the received version information of each service, determining whether to change the master gateway device.

According to an embodiment of the present invention, a gateway device may include a communication unit; a gateway unit; a memory unit; and a control unit configured to retrieve one or more other gateway devices, to send a request for a service list to the retrieved one or more other gateway devices, to receive the service list and version information of each service, and to, based on the received version information of each service, determine whether to change the master gateway device.

According to an embodiment of the present invention, a method for storing a service at an electronic device may include steps of retrieving one or more gateway devices; requesting a list of supportable services of the retrieved one or more gateway devices; receiving the service list and version information of each service from the retrieved one or more gateway devices; and storing the service for each of the retrieved one or more gateway devices.

According to an embodiment of the present invention, an electronic device may include a communication unit; an input unit; and a control unit configured to retrieve one or more gateway devices, to request a list of supportable services of the retrieved one or more gateway devices, to receive the service list and version information of each service from the retrieved one or more gateway devices, and to store the service for each of the retrieved one or more gateway devices.

According to an embodiment of the present invention, a method for determining a master gateway device at an electronic appliance having a gateway may include steps of retrieving one or more gateway devices; sending a request for a service list to the retrieved one or more gateway devices; receiving the service list and version information of each service; and based on the received version information of each service, determining whether to change the gateway of the electronic appliance to the master gateway device.

According to an embodiment of the present invention, an electronic appliance may include a communication unit; a gateway unit; a memory unit; and a control unit configured to retrieve one or more gateway devices, to send a request for a service list to the retrieved one or more gateway devices, to receive the service list and version information of each service, and to, based on the received version information of each service, determine whether to change the gateway unit to the master gateway device.

Advantageous Effects of Invention

The method and device for determining a master gateway in a network can provide a seamless home network service even though a gateway device is added to a pre-constructed home network. Also, since a service version of an added gateway can be shared in a home network, the home network can operate in the newest service version.

BRIEF DESCRIPTION OF DRAWINGS

FIG. 5 is a signal flow diagram illustrating a method for storing a service for each gateway device at an electronic device according to an embodiment of the present invention.

MODE FOR THE INVENTION

Figure 1:
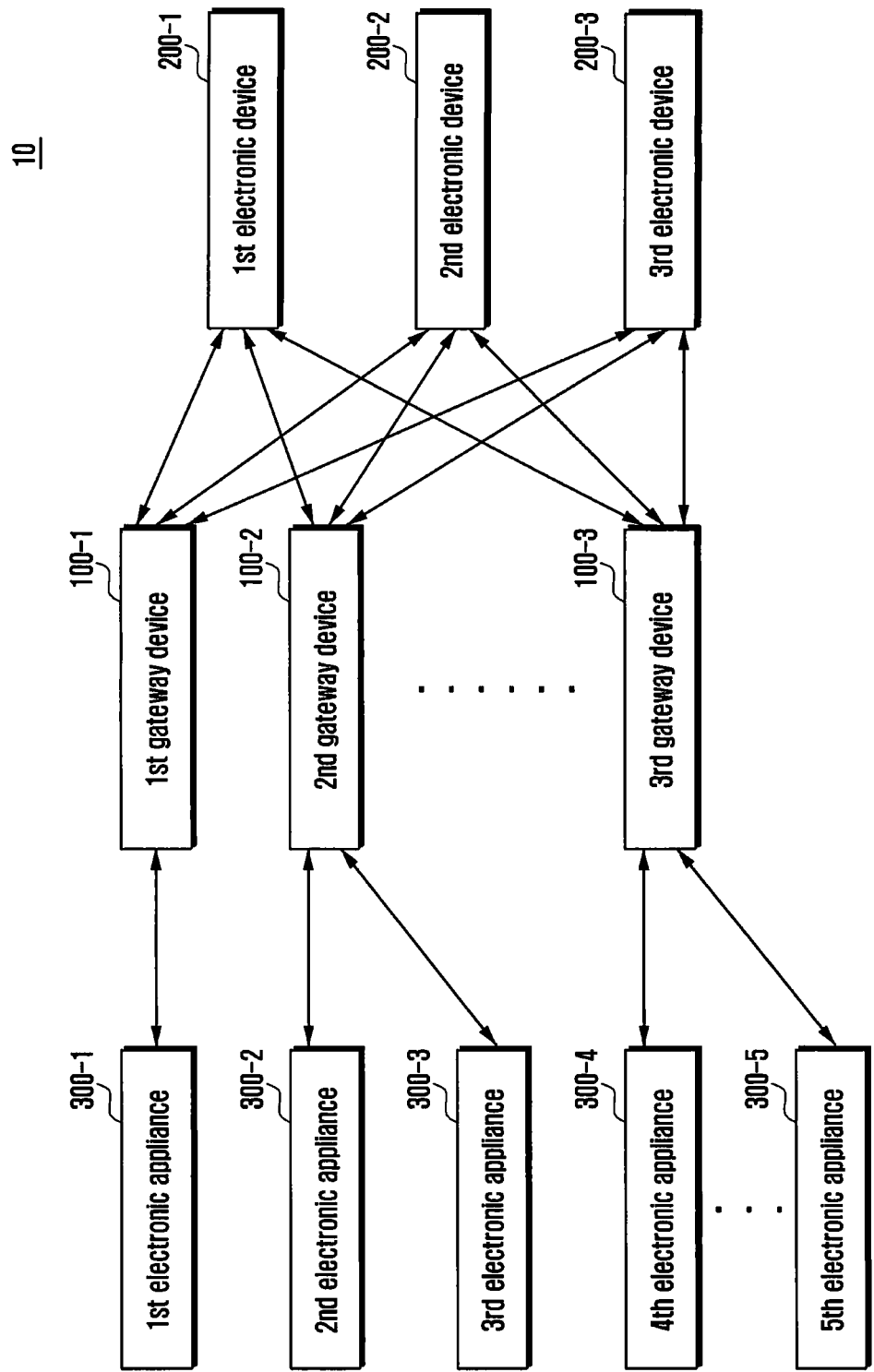
FIG. 1 is a diagram of a home network system according to an embodiment of the present invention.

Hereinafter, various embodiments will be described with reference to the accompanying drawings. It will be noted that in the drawings, the same reference numerals denote corresponding features consistently. Additionally, well known functions and configurations may be omitted to avoid obscuring the subject matter of the present invention. The present invention may be embodied in many different forms without changing technical subject matters and essential features as will be understood by those skilled in the art. Therefore, embodiments set forth herein are exemplary only and not to be construed as a limitation.

FIG. 1 is a diagram of a home network system 10 according to an embodiment of the present invention.

The home network system 10 may be a private house system that supports automation. The home network system 10 may permit a home automation (HA) or home control system for automatically controlling home security, illumination, temperature, and the like, a data network for binding indoor information communication devices, an A/V network for binding TV and audio equipment, a network of electronic appliances, a control network for a crime/disaster prevention and for a control of an air conditioning and heating gas, a medical system access, and the like.

The home network system 10 includes one or more gateway devices 100-1, 100-2 and 100-3, one or more electronic devices 200-1, 200-2 and 200-3, and one or more electronic appliances 300-1, 300-2, 300-3, 300-4 and 300-5. Hereinafter, the gateway devices 100, the electronic devices 200 and the electronic appliances 300 may be represented as at least one device connected to the home network system 10.

The one or more gateway devices 100-1, 100-2 and 100-3 are devices for performing a role of entrance from one network to other network and are used for connecting one network, e.g., a local access network (LAN), to other network. Each network transmits data with protocol different from that of other network. Even though networks have different ways of transmitting data, the one or more gateway devices 100-1, 100-2 and 100-3 can mediate between networks by protocol conversion.

The one or more gateway devices 100-1, 100-2 and 100-3 may perform a role of hub for connecting and managing indoor information electronic appliances as well as a role of gateway for mediating between one network and other network in the home network system 10.

The one or more gateway devices 100-1, 100-2 and 100-3 may be an independently formed gateway apparatus and also take various forms such as an air conditioner, a microwave oven, a TV, a set-top box, a PC, a laptop, a smart phone, a mobile terminal, or the like. For example, the gateway devices 100 that take various forms such as an air conditioner, a microwave oven, a TV, a set-top box, a PC, a laptop, a smart phone, or a mobile terminal may be functionally contained in the electronic appliances 300.

The home network system 10 that includes the one or more gateway devices 100-1, 100-2 and 100-3 may select one of the gateway devices 100-1, 100-2 and 100-3 as a master gateway device. Although a case where the first gateway device 100-1 is selected as the master gateway device is described for convenience, it will be apparent to those skilled in the art that the second or third gateway device 100-2 or 100-3 may be also selected as the master gateway device in the home network system 10.

The master gateway device 100-1 means a device capable of being activated and connecting the home network 10 to other network. The master gateway device 100-1 may be connected to other gateway devices 100-2 and 100-3. The master gateway device 100-1 may be connected to other network and then control communication of the other gateway devices 100-2 and 100-3 connected thereto and/or the one or more electronic appliances 300-1, 300-2, 300-3, 300-4 and 300-5 to the connected other network (e.g., internet). The master gateway device 100-1 may deliver a control command, received from a user, to the other gateway devices 100-2 and 100-3 and/or the one or more electronic appliances 300-1, 300-2, 300-3, 300-4 and 300-5. The user may control (e.g., a mode control, a schedule control) the electronic appliances 300-1, 300-2, 300-3, 300-4 and 300-5 and/or the gateway devices 100-1, 100-2 and 100-3 in the home network system 10 through the master gateway device 100-1 or monitor the status of the electronic appliances 300-1, 300-2, 300-3, 300-4 and 300-5 and/or the gateway devices 100-1, 100-2 and 100-3.

The master gateway device 100-1 may perform working order setting for the electronic appliances 300-1, 300-2, 300-3, 300-4 and 300-5 based on the home network system 10, home code setting for access to the internet, address allocation, device list management, management over a multi network manager, system event management, and device basic information management.

For example, the master gateway device 100-1 may have a list of home network services or a list of information about devices such as the electronic appliances 300-1, 300-2, 300-3, 300-4 and 300-5 and/or the gateway devices 100-1, 100-2 and 100-3 equipped in the home network system 10.

The master gateway device 100-1 may retrieve a home network service, based on device information about the electronic appliances 300-1, 300-2, 300-3, 300-4 and 300-5 and/or the gateway devices 100-1, 100-2 and 100-3 in the home network system 10 and then manage the execution of the retrieved home network service. For example, such a home network service may be a remote control service, a security service, a medical/health service, a streaming service, a power saving service, a data service, an A/V service, or the like.

Such a home network service is associated with the electronic appliances 300-1, 300-2, 300-3, 300-4 and 300-5 contained in the home network system. If the first electronic appliance 300-1 among the electronic appliances 300-1, 300-2, 300-3, 300-4 and 300-5 is an air conditioner, this is associated with a remote control service and a power saving service among home network services. For example, if the first gateway device 100-1 can provide a remote control service and a power saving service, if the second gateway device 100-2 can provide a remote control service, a data service and an A/V service, and if the third gateway device 100-3 can provide a medical/health service, the first gateway device 100-1 may operate as a gateway of the first electronic appliance 300-1. According to an embodiment, if one or more gateway devices 100-1, 100-2 and 100-3 exist in the home network, it is possible to select at least one master gateway based on a service list offered by the gateway devices 100-1, 100-2 and 100-3.

The one or more electronic devices 200-1, 200-2 and 200-3 are control devices for the home network system 10 and may be devices, such as a smart phone, a mobile terminal, a tablet PC, and a laptop PC, capable of displaying a user interface, or may be a button apparatus, a remote controller, etc. with no user interface. The one or more electronic devices 200-1, 200-2 and 200-3 may be connected to the one or more gateway devices 100-1, 100-2 and 100-3 and may control the operation of the one or more electronic appliances 300-1, 300-2, 300-3, 300-4 and 300-5 connected to the one or more gateway devices 100-1, 100-2 and 100-3.

The one or more electronic appliances 300-1, 300-2, 300-3, 300-4 and 300-5 may be connected to the one or more gateway devices 100-1, 100-2 and 100-3 and may execute the function according to a control signal received from the one or more electronic devices 200-1, 200-2 and 200-3.

Figure 2:
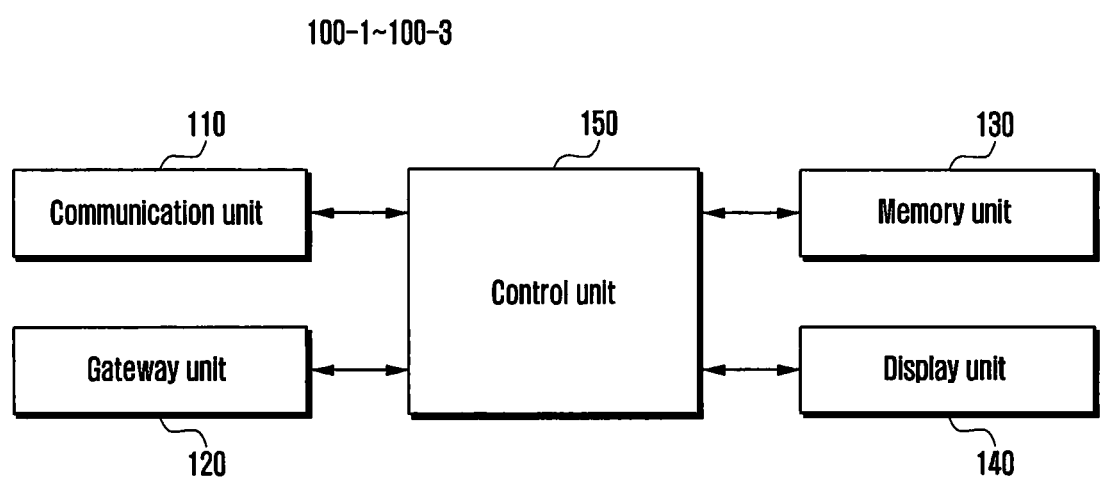
FIG. 2 is a block diagram of a gateway device according to an embodiment of the present invention.

FIG. 2 is a block diagram of a gateway device 100-1, 100-2 or 100-3 according to an embodiment of the present invention.

As discussed above, the one or more gateway devices 100-1, 100-2 and 100-3 may be an independently formed gateway apparatus and also take various forms such as an air conditioner, a microwave oven, a TV, a set-top box, a PC, a tablet PC, a laptop PC, a smart phone, a mobile terminal, or the like. The first, second and third gateway devices 100-1, 100-2 and 100-3 may have the same configurations.

The gateway devices 100-1, 100-2 and 100-3 may include a communication unit 110, a gateway unit 120, a memory unit 130, a display unit 140, and a control unit 150.

The communication unit 110 may transmit or receive data to or from the one or more gateway devices 100-1, 100-2 and 100-3, the one or more electronic devices 200-1, 200-2 and 200-3, and the one or more electronic appliances 300-1, 300-2, 300-3, 300-4 and 300-5 in the home network system 10. The communication unit 110 supports a wireless communication function of the gateway devices 100-1, 100-2 and 100-3 and, if the gateway devices 100-1, 100-2 and 100-3 supports a mobile communication function, may be configured as a mobile communication module. For this, the communication unit 110 may include a radio frequency (RF) transmitter which up-converts the frequency of an outgoing signal and then amplifies the signal, an RF receiver which amplifies with low-noise an incoming signal and down-converts the frequency of the signal, and the like. Additionally, when the gateway devices 100-1, 100-2 and 100-3 supports a short range wireless communication function such as WiFi communication, Bluetooth communication, Zigbee communication, ultra wideband (UWB) communication, or near field communication (NFC), the communication unit 110 may include a WiFi communication module, a Bluetooth communication module, a Zigbee communication module, a UWB communication module, or an NFC communication module.

The gateway unit 120 is a unit for enabling two or more communication network of different or similar types to be connected to each other and exchange information therebetween. Therefore, the gateway unit 120 may connect the home network system 10 and any external communication network.

The memory unit 130 may include a volatile memory or a nonvolatile memory. For example, the volatile memory may include a static random access memory (SRAM), a dynamic random access memory (DRAM), or the like, and the nonvolatile memory may include a read only memory (ROM), a flash memory, a hard disk, a secure digital (SD) memory card, a multi-media card (MMC), or the like. The memory unit 130 may store a number of programs and data required for the operation of the gateway devices 100-1, 100-2 and 100-3. The memory unit 120 may contain a list of supportable home network services of the gateway devices 100-1, 100-2 and 100-3 and version information of each home network service. The memory unit 120 may store synchronization data received from the one or more electronic appliances 300-1, 300-2, 300-3, 300-4 and 300-5. The synchronization data may include, for example, history information (the amount of electricity consumption, a control history of the electronic appliance) of each of the one or more electronic appliances 300-1, 300-2, 300-3, 300-4 and 300-5.

The display unit 140 may display (output) information processed by the gateway devices 100-1, 100-2 and 100-3. The display unit 140 may include at least one of a liquid crystal display (LCD), a thin film transistor (TFT) LCD, a light emitting diode (LED), an organic LED (OLED), an active matrix OLED (AMOLED), a flexible display, a bended display, and three-dimensional (3D) display. Some of such displays may be realized as a transparent display formed of a transparent or photo-transparent type. The display unit 140 may include a touch panel through which a user can enter a user input.

The control unit 150 may perform normal communication functions, such as a call and data transmission/reception, and also control other elements. The control unit 150 may create a control signal for connecting the corresponding gateway device 100-1, 100-2 or 100-3 to the home network system 10. The control unit 150 may retrieve the gateway devices 100-1, 100-2 and 100-3 connected to the home network system 10. The control unit 150 may request a home network service list from the retrieved gateway device 100-1, 100-2 or 100-3. In response to this request, the control unit 150 contained in the retrieved gateway device 100-1, 100-2 or 100-3 may transmit the home network service list and version information of each home network service to the gateway devices 100-1, 100-2 or 100-3 that requests the home network service list.

Based on the received home network service list and version information of each home network service, the control unit 150 may determine a home network service to be received. The control unit 150 may determine such a home network service by comparing the received version information of each home network service with stored version information of each service. If the stored version information is newer than the received version information as a result of comparison, the control unit 150 may change the gateway device 100-1, 100-2 or 100-3, performing retrieval, to a master gateway device. If the stored version information is the same as or older than the received version information, the retrieved gateway device 100-1, 100-2 or 100-3 may be maintained as a master gateway device. The control unit 150 may send, to other gateway device 100-1, 100-2 or 100-3, a request for data of a home network service to be received. The retrieved gateway device 100-1, 100-2 or 100-3 may transmit, to the retrieving gateway device 100-1, 100-2 or 100-3, the requested data of a home network service. The control unit 150 may control the memory unit 130 to store the received data of a home network service. The control unit 150 may provide the received home network service to the one or more gateway devices 100-1, 100-2 and 100-3 or the one or more electronic appliances 300-1, 300-2, 300-3, 300-4 and 300-5. After the home network service is provided, the control unit 150 may request a service stop from the gateway device that transmits the home network service. In response to a service stop request signal, the control unit 150 of the gateway device that transmits the home network service may stop providing the home network service. The control unit 150 may deliver a signal for indicating a change of a master gateway to the one or more gateway devices 100-1, 100-2 and 100-3 or the one or more electronic appliances 300-1, 300-2, 300-3, 300-4 and 300-5 through the communication unit 110.

If a request for a home network service list is received from the one or more electronic devices 200-1, 200-2 and 200-3, the control unit 150 may transmit the home network service list and version information of each service to the one or more electronic devices 200-1, 200-2 and 200-3 through the communication unit 110 in response to the request.

Figure 3:
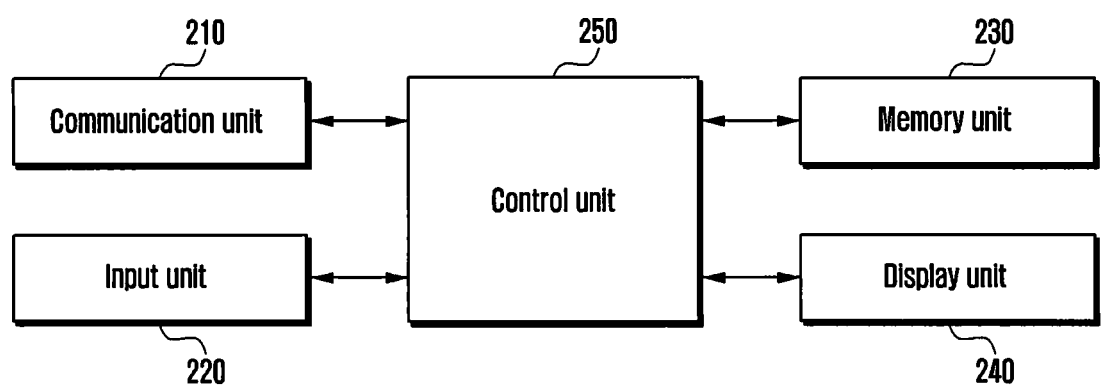
FIG. 3 is a block diagram of an electronic device according to an embodiment of the present invention.

FIG. 3 is a block diagram of an electronic device 200-1, 200-2 or 200-3 according to an embodiment of the present invention.

The electronic devices 200-1, 200-2 and 200-3 may include a communication unit 210, an input unit 220, a memory unit 230, a display unit 240, and a control unit 250.

The communication unit 210 may transmit or receive data to or from the one or more gateway devices 100-1, 100-2 and 100-3, the one or more electronic devices 200-1, 200-2 and 200-3, and the one or more electronic appliances 300-1, 300-2, 300-3, 300-4 and 300-5 in the home network system 10. The communication unit 210 supports a wireless communication function of the electronic devices 200-1, 200-2 and 200-3 and, if the electronic devices 200-1, 200-2 and 200-3 supports a mobile communication function, may be configured as a mobile communication module. For this, the communication unit 210 may include a radio frequency (RF) transmitter which up-converts the frequency of an outgoing signal and then amplifies the signal, an RF receiver which amplifies with low-noise an incoming signal and down-converts the frequency of the signal, and the like. Additionally, when the electronic devices 200-1, 200-2 and 200-3 supports a short range wireless communication function such as WiFi communication, Bluetooth communication, Zigbee communication, ultra wideband (UWB) communication, or near field communication (NFC), the communication unit 210 may include a WiFi communication module, a Bluetooth communication module, a Zigbee communication module, a UWB communication module, or an NFC communication module.

The input unit 220 is a device for allowing a user to enter information. The input unit 110 may have a plurality of alphanumeric keys and functions and may output, to the control unit 150, key input date corresponding to a key pressed by the user.

The memory unit 230 may include a volatile memory or a nonvolatile memory. For example, the volatile memory may include a static random access memory (SRAM), a dynamic random access memory (DRAM), or the like, and the nonvolatile memory may include a read only memory (ROM), a flash memory, a hard disk, a secure digital (SD) memory card, a multi-media card (MMC), or the like. The memory unit 230 may store a number of programs and data required for the operation of the electronic devices 200-1, 200-2 and 200-3. The memory unit 220 may contain a list of providable home network services of the gateway devices 100-1, 100-2 and 100-3 or a list of communicatable gateway devices 100-1, 100-2 and 100-3 for each home network service.

The display unit 240 may display (output) information processed by the electronic devices 200-1, 200-2 and 200-3. The display unit 240 may include at least one of a liquid crystal display (LCD), a thin film transistor (TFT) LCD, a light emitting diode (LED), an organic LED (OLED), an active matrix OLED (AMOLED), a flexible display, a bended display, and three-dimensional (3D) display. Some of such displays may be realized as a transparent display formed of a transparent or photo-transparent type. The input unit 220 and the display unit 240 may be formed as a touch screen through which a user can enter a user input.

The control unit 250 may perform normal communication functions, such as a call and data transmission/reception, and also control other elements. The control unit 250 may control the operation of the one or more electronic appliances 300-1, 300-2, 300-3, 300-4 and 300-5 connected to the one or more gateway devices 100-1, 100-2 and 100-3.

Figure 4:
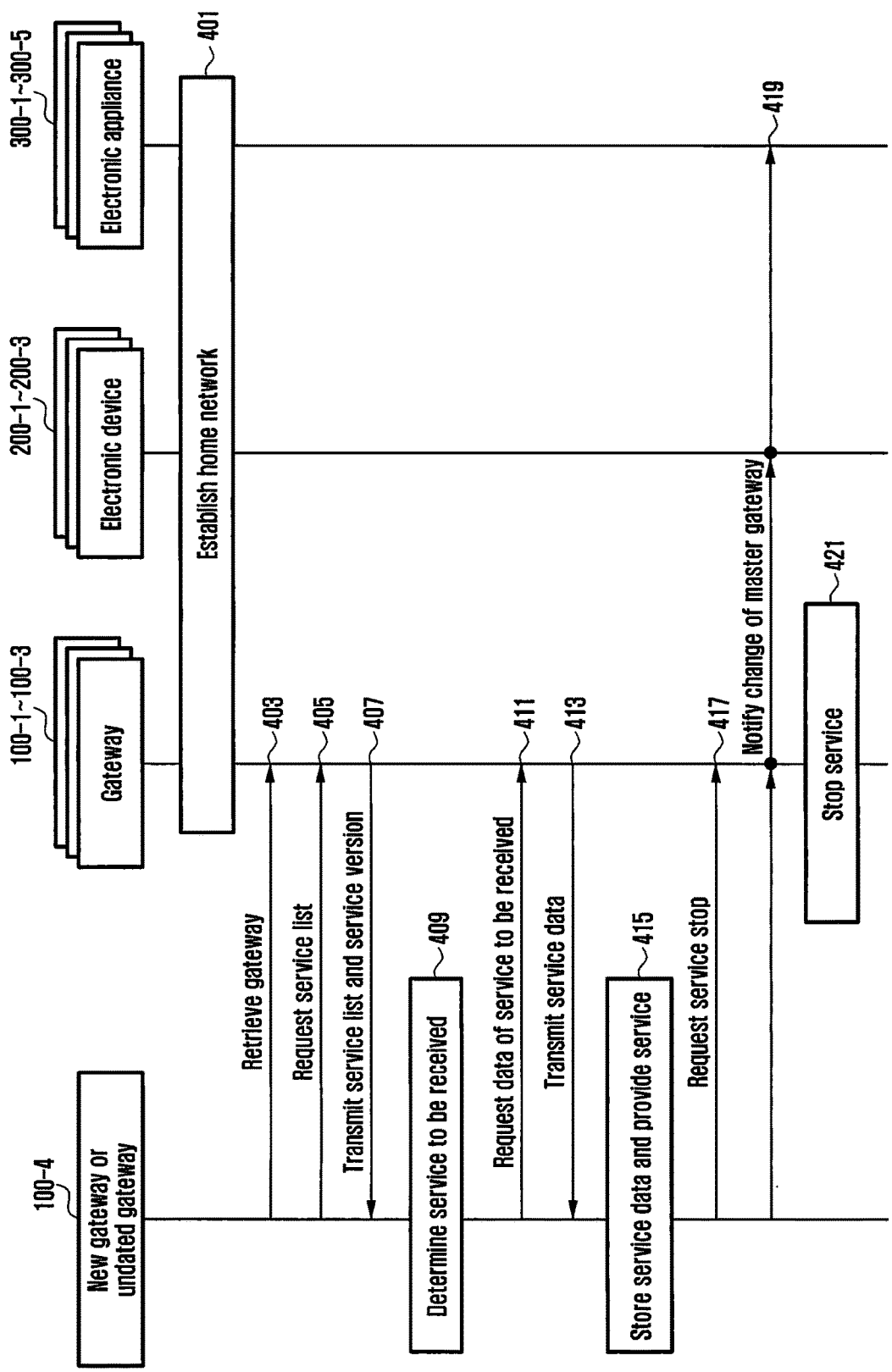
FIG. 4 is a signal flow diagram illustrating a method for determining a master gateway device of a home network system according to an embodiment of the present invention.

FIG. 4 is a signal flow diagram illustrating a method for determining a master gateway device of a home network system 10 according to an embodiment of the present invention.

At step 401, the one or more gateway devices 100-1, 100-2 and 100-3, the one or more electronic devices 200-1, 200-2 and 200-3, and the one or more electronic appliances 300-1, 300-2, 300-3, 300-4 and 300-5 may establish a home network. A new or undated gateway device 100-4 may have the same configuration and function as those of the one or more gateway devices 100-1, 100-2 and 100-3 shown in FIG. 2.

At step 403, the new or updated gateway device 100-4 may retrieve the one or more gateway devices 100-1, 100-2 and 100-3. At step 403, the new or updated gateway device 100-4 may be added to the established home network system. At this time, the added new or updated gateway device 100-4 may retrieve the one or more gateway devices 100-1, 100-2 and 100-3 in the established home network system.

At this time, the new or updated gateway device 100-4 may check a home network service by using at least one of a simple service discovery protocol (SSDP) technique and a multi-DNS-service discovery technique.

At step 405, the new or updated gateway device 100-4 may request a home network service list from the one or more gateway devices 100-1, 100-2 and 100-3.

At step 407, the one or more gateway devices 100-1, 100-2 and 100-3 may transmit a home network service list and version information of each service in response to the request of the new or updated gateway device 100-4.

At step 409, the new or updated gateway device 100-4 determines a home network service to be received (or to be transferred). For example, at step 409, the new or updated gateway device 100-4 determines such a home network service by comparing the received version with a service version stored in the new or updated gateway device 100-4. If the stored service version is newer than the received service version as a result of comparison, the new or updated gateway device 100-4 may change the new or updated gateway device 100-4 to a master gateway device at step 409. If the stored service version is the same as or older than the received service version, the new or updated gateway device 100-4 may maintain a current master gateway device.

At step 411, the new or updated gateway device 100-4 may send, to the one or more gateway devices 100-1, 100-2 and 100-3, a request for data of a home network service to be received (or to be transferred).

At step 413, the one or more gateway devices 100-1, 100-2 and 100-3 may transmit, to the new or updated gateway device 100-4, data of a home network service in response to the request of the new or updated gateway device 100-4.

At step 415, the new or updated gateway device 100-4 may store the received data of a home network service and also provide the home network service to the one or more gateway devices 100-1, 100-2 and 100-3 or the one or more electronic appliances 300-1, 300-2, 300-3, 300-4 and 300-5.

At step 417, the new or updated gateway device 100-4 may request the specific gateway device transmitting the home network service to stop providing the home network service. At this step 417, without a network stop, the new or updated gateway device 100-4 may stop the specific gateway device only from providing the home network service.

At step 419, the new or updated gateway device 100-4 may notify a change of the master gateway device 100-4 to the one or more gateway devices 100-1, 100-2 and 100-3, the one or more electronic devices 200-1, 200-2 and 200-3, or the one or more electronic appliances 300-1, 300-2, 300-3, 300-4 and 300-5.

At step 421, the specific gateway device that transmits the home network service may stop providing the home network service.

FIG. 5 is a signal flow diagram illustrating a method for storing a service for each gateway device at an electronic device according to an embodiment of the present invention.

At step 501, a new electronic device 200-4 may retrieve the one or more gateway devices 100-1, 100-2 and 100-3. At this time, the new electronic device 200-4 may check a home network service by using a simple service discovery protocol (SSDP) technique or a multi-DNS-service discovery technique.

At steps 503-1, 503-2 and 503-3, the new electronic device 200-4 may send a request for a list of supportable home network services of each gateway device 100-1, 100-2 or 100-3.

At steps 505-1, 505-2 and 505-3, each gateway device 100-1, 100-2 or 100-3 may transmit the list of supportable home network services and version information of each home network service to the new electronic device 200-4 in response to the request of the new electronic device 200-4.

At step 507, the new electronic device 200-4 may store the supportable home network services of each gateway device 100-1, 100-2 or 100-3.

While this invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method for determining a master gateway device at a gateway device, the method comprising steps of:
  retrieving one or more other gateway devices;
  sending a request for a service list to the retrieved one or more other gateway devices, wherein the service list is a list of home network services that are supported by each of the retrieved one or more other gateway devices;
  receiving the service list and version information of each service, wherein the version information of each service is information about a version of each home network service that is supported by the retrieved one or more other gateway devices;
  determining a home network service to be received by comparing the received version information of each home network service with a stored version of each home network service;
  determining whether the stored version of each home service is newer than the received version information of each home service;
  in response to determining that the stored version of each home network service is newer than the received version information of each home network service,
    changing the gateway device to the master gateway device,
    sending, to the retrieved one or more gateway devices, a request for data of the home network service to be received,
    receiving, from the retrieved one or more other gateway devices, the data of the home network service to be received,
    providing the home network service to the retrieved one or more gateway devices,
    requesting a stop of providing the home network service from the retrieved one or more other gateway devices, and
    notifying a change of the master gateway device to a network; and
  in response to determining that the stored version of each home service is the same as or older than the received version information of each home service,
    maintaining the retrieved one or more other gateway devices as the master gateway device.

2. The method of claim 1, further comprising steps of storing the data of the home network service to be received.

3. The method of claim 1, wherein the retrieving step is performed using at least one of a simple service discovery protocol (SSDP) technique and a multi-DNS-service discovery technique.

4. A gateway device comprising:
  a communication unit;
  a gateway unit;
  a memory unit; and
  a control unit coupled to the memory unit and operable to execute instructions stored in the memory unit to:
  retrieve one or more other gateway devices,
  send a request for a service list to the retrieved one or more other gateway devices, wherein the service list is a list of home network services that are supported by each of the retrieved one or more other gateway devices;
  receive the service list and version information of each service, wherein the version information of each service is information about a version of each home network service that is supported by the retrieved one or more other gateway devices;
  determine a home network service to be received by comparing the received version information of each home network service with a stored version of each home network service;
  determine whether the stored version of each home service is newer than the received version information of each home service;
  in response to determining that the stored version of each home network service is newer than the received version information of each home network service,
    change the gateway device to a master gateway device,
    send, to the retrieved one or more gateway devices, a request for data of the home network service to be received,
    receive, from the retrieved one or more other gateway devices, the data of the home network service to be received,
    provide the home network service to the retrieved one or more gateway devices, request a stop of providing the home network service from the retrieved one or more other gateway devices, and notify a change of the master gateway device to a network; and in response to determining that the stored version of each home service is the same as or older than the received version information of each home service, maintain the retrieved one or more other gateway devices as the master gateway device.

5. The gateway device of claim 4, wherein the control unit is further configured to store the data of the service to be received.

6. A method for determining a master gateway device at an electronic appliance having a gateway device, the method comprising steps of:

retrieving one or more gateway devices;

sending a request for a service list to the retrieved one or more gateway devices, wherein the service list is a list of home network services that are supported by each of the retrieved one or more gateway devices;

receiving the service list and version information of each service from the retrieved one or more gateway devices, wherein the version information of each service is information about a version of each home network service that is supported by the retrieved one or more gateway devices;

determining a home network service to be received by comparing the received version information of each home network service with a stored version of each home network service;

determining whether the stored version of each home service is newer than the received version information of each home service;

in response to determining that the stored version of each home network service is newer than the received version information of each home network service, changing the gateway device to the master gateway device, sending, to the retrieved one or more gateway devices, a request for data of the home network service to be received, receiving, from the retrieved one or more gateway devices, the data of the home network service to be received, providing the home network service to the retrieved one or more gateway devices, requesting a stop of providing the home network service from the retrieved one or more gateway devices, and notifying a change of the master gateway device to a network; and in response to determining that the stored version of each home service is the same as or older than the received version information of each home service, maintaining the retrieved one or more gateway devices as the master gateway device.

7. An electronic appliance comprising:

a communication unit;

a gateway unit;

a memory unit and a control unit coupled to the memory unit and operable to execute instructions stored in the memory unit to:

retrieve one or more gateway devices, send a request for a service list to the retrieved one or more gateway devices, wherein the service list is a list of home network services that are supported by each of the retrieved one or more gateway devices;

receive the service list and version information of each service from the retrieved one or more gateway devices, wherein the version information of each service is information about a version of each home network service that is supported by the retrieved one or more gateway devices, determine a home network service to be received by comparing the received version information of each home network service with a stored version of each home network service;

determine whether the stored version of each home service is newer than the received version information of each home service;

in response to determining that the stored version of each home network service is newer than the received version information of each home network service, change the gateway unit device to a master gateway device, send, to the retrieved one or more gateway devices, a request for data of the home network service to be received, receive, from the retrieved one or more gateway devices, the data of the home network service to be received, provide the home network service to the retrieved one or more gateway devices, request a stop of providing the home network service from the retrieved one or more gateway devices, and notify a change of the master gateway device to a network; and in response to determining that the stored version of each home service is the same as or older than the received version information of each home service, maintaining the retrieved one or more gateway devices as the master gateway device.

* * * * *